US007448859B2

(12) United States Patent
de Meulenaer et al.

(10) Patent No.: US 7,448,859 B2
(45) Date of Patent: Nov. 11, 2008

(54) DEVICES AND METHOD FOR TREATING COOLING FLUIDS UTILIZED IN TIRE MANUFACTURING

(75) Inventors: Eric Cordemans de Meulenaer, Wezembeek (BE); Baudouin Hannecart, Brussels (BE); Kevin M. Gottschalk, Bushkill, PA (US)

(73) Assignee: Ashland Licensing and Intellectual Property LLC, Dublin, OH (US)

( * ) Notice: Subject to any disclaimer, the term of this patent is extended or adjusted under 35 U.S.C. 154(b) by 0 days.

(21) Appl. No.: 11/747,079

(22) Filed: May 10, 2007

(65) Prior Publication Data

US 2008/0020079 A1 Jan. 24, 2008

Related U.S. Application Data

(63) Continuation of application No. PCT/US2005/041395, filed on Nov. 15, 2005.

(60) Provisional application No. 60/629,152, filed on Nov. 17, 2004.

(51) Int. Cl.
*B29D 30/00* (2006.01)
(52) U.S. Cl. .................... 425/28.1; 422/20; 422/21
(58) Field of Classification Search ............... 210/748, 210/696, 695, 422; 250/504 R, 493.1; 425/28.1; 422/20, 21
See application file for complete search history.

(56) References Cited

U.S. PATENT DOCUMENTS

| 2,163,649 | A | 6/1939 | Weaver |
| 2,717,874 | A | 9/1955 | Verain |
| 3,257,941 | A | 6/1966 | Woflson et al. |
| 3,672,823 | A | 6/1972 | Boucher |
| 4,003,832 | A * | 1/1977 | Henderson et al. .......... 210/728 |
| 4,076,617 | A | 2/1978 | Bybel et al. |
| 4,144,722 | A | 3/1979 | Mattwell |
| 4,211,744 | A | 7/1980 | Boucher |
| 4,602,184 | A | 7/1986 | Meitzler |

(Continued)

FOREIGN PATENT DOCUMENTS

DE 4407564 9/1995

(Continued)

OTHER PUBLICATIONS

Hua I et al., "Optimization of Ultrasonic Irradiation as an Advanced Oxidation Technology," Environ. Sci. Technol. vol. 31, No. 8, pp. 2237-2243, Aug. 1997.

(Continued)

*Primary Examiner*—Walter D. Griffin
*Assistant Examiner*—Cameron J Allen
(74) *Attorney, Agent, or Firm*—Knobbe Martens Olson & Bear LLP

(57) ABSTRACT

Devices and methods for treating, preventing from growth, and neutralizing microorganisms in cooling fluids utilized in tire manufacturing, using high-frequency, low-energy ultrasound. In one embodiment, a method includes simultaneously exposing said cooling fluid to gas and high-frequency ultrasound. In another embodiment, a device includes a compartment for holding a reservoir of tire manufacturing cooling fluid, an ultrasound emitter configured to emit high-frequency ultrasound signals into the compartment, and a gas emitter configured to emit gas into the ultrasound field in the compartment containing the cooling fluid.

6 Claims, 2 Drawing Sheets

U.S. PATENT DOCUMENTS

| | | | |
|---|---|---|---|
| 4,820,260 A | 4/1989 | Hayden | |
| 4,879,045 A | 11/1989 | Eggerichs | |
| 4,961,860 A | 10/1990 | Masri | |
| 4,971,991 A | 11/1990 | Umemura | |
| 5,130,032 A | 7/1992 | Sartori | |
| 5,149,319 A | 9/1992 | Unger | |
| 5,198,122 A | 3/1993 | Koszalka et al. | |
| 5,215,680 A | 6/1993 | D'Arrigo | |
| 5,224,051 A | 6/1993 | Johnson | |
| 5,380,411 A | 1/1995 | Schlief | |
| 5,523,058 A | 6/1996 | Umemura | |
| 5,558,092 A | 9/1996 | Unger et al. | |
| 5,611,993 A | 3/1997 | Babaev | |
| 5,632,886 A * | 5/1997 | Staniec | 210/151 |
| 5,679,257 A * | 10/1997 | Coate et al. | 210/695 |
| 5,827,204 A | 10/1998 | Grandia et al. | |
| 5,971,949 A | 10/1999 | Levin et al. | |
| 5,997,812 A * | 12/1999 | Burnham et al. | 422/24 |
| 6,068,857 A | 5/2000 | Weitschies et al. | |
| 6,077,431 A | 6/2000 | Kawanishi et al. | |
| 6,113,558 A | 9/2000 | Rosenschein et al. | |
| RE36,939 E | 10/2000 | Tachibana et al. | |
| 6,308,714 B1 | 10/2001 | Peterson et al. | |
| 6,309,355 B1 | 10/2001 | Cain et al. | |
| 6,413,216 B1 | 7/2002 | Cain et al. | |
| 6,428,532 B1 | 8/2002 | Doukas et al. | |
| 6,506,584 B1 | 1/2003 | Chandler et al. | |
| 6,540,922 B1 * | 4/2003 | Cordemans et al. | 210/695 |
| 6,656,436 B1 | 12/2003 | Sentagnes et al. | |
| 6,736,979 B2 | 5/2004 | De Meulenaer et al. | |
| 6,770,248 B2 * | 8/2004 | Haggett et al. | 422/128 |
| 7,048,863 B2 | 5/2006 | Swinnen et al. | |
| 7,267,778 B2 | 9/2007 | De Meulenaer et al. | |
| 2002/0111569 A1 | 8/2002 | Rosenschein et al. | |
| 2002/0153083 A1 | 10/2002 | Takagi | |
| 2003/0136824 A1 | 7/2003 | Simon | |
| 2004/0065624 A1* | 4/2004 | Thomas et al. | 210/748 |
| 2006/0144801 A1 | 7/2006 | Swinnen et al. | |
| 2007/0000844 A1 | 1/2007 | Swinnen et al. | |

FOREIGN PATENT DOCUMENTS

| | | |
|---|---|---|
| DE | 4430587 | 2/1996 |
| DE | 19700164 | 7/1998 |
| EP | 0 577 871 | 1/1994 |
| EP | 0 619 104 | 10/1994 |
| EP | 0 680 779 | 11/1995 |
| EP | 0 515 346 | 2/1996 |
| EP | 0 661 090 | 6/1998 |
| EP | 0936187 | 8/1999 |
| EP | 0 633 049 | 9/1999 |
| EP | 1008556 | 6/2000 |
| GB | 1389291 | 4/1975 |
| JP | 58128113 | 7/1983 |
| JP | 5228480 | 9/1993 |
| JP | 5228481 | 9/1993 |
| JP | 5228496 | 9/1993 |
| JP | 5345192 | 12/1993 |
| JP | 7155756 | 6/1995 |
| WO | WO 80/00226 | 2/1980 |
| WO | WO 93/13674 | 7/1993 |
| WO | WO 98/10394 | 1/1998 |
| WO | WO 98/05595 | 2/1998 |
| WO | WO 00/02821 | 1/2000 |
| WO | WO 2004/041314 | 5/2004 |
| WO | WO 2005/005322 | 10/2005 |
| WO | WO 2006/038926 | 4/2006 |

OTHER PUBLICATIONS

Marmor, et al., "Tumor eradication and cell survival after localized hyperthermia induced by ultrasound," Cancer Research, vol. 39, pp. 2166-2171, (Jun. 1979).

Miller, et al., "Single strand DNA breaks in human leukocytes inducted by ultrasound in vitro," Ultrasound in Med. & Biol., vol. 15, No. 8, pp. 765-771, (1989).

Nyborg, W. L. and Ziskin, M. C. (Eds.), *Biological Effects of Ultrasound*, Churchill-Livingstone Inc., New York, pp. 23-33, (1985).

Phull, S. S. et al., "The Development and Evaluation of Ultrasound in the Biocidal Treatment of Water," Ultrasonics Sonochemistry, vol. 4, No. 2, pp. 157-164, Apr. 1997.

Wyllie, et al., "Apoptosis and the regulation of cell numbers in normal and neoplastic tissues: an overview," Cancer and Metastasis Reviews, vol. 11, pp. 95-103, (1992).

Petrier, Christian et al., "Sonochemical Degradation of Phenol in Dilute Aqueous Solutions: Comparison of the Reaction Rates at 20 and 487 kHz," J. Phys. Chem., pp. 10514-10520, 1994.

Umemura, S. et al., "Sonodynamic Treatment by Inducing Microbubble Reaction," J.E.M.U., No. 2/3, pp. 265-270, 19998.

Umemura, Shin-ichiro et al., "Mechanism of Cell Damage by Ultrasound in Combination with Hematoporphyrin," Jpn. J. Cancer Res., No. 81, pp. 962-966, Sep. 1990.

Yu et al., A Review of Research Into the Uses of Low Level Ultrasound in Cancer Therapy, Ultrasonics Sonochemistry 11, pp. 95-103, 2004.

Bohm et al., "Viability of Plan Cell Suspensions Exposed to Homogeneous Ultrasonic Fields of Different Energy Density and Wave Type," Ultrasonics 38, pp. 629-632, 2000.

Miller, Douglas J., "Effects of High Amplitude 1-MMHz Standing Ultrasonic Field on the Algae Hydrodictyon," IEEE, No. 2, 1986.

Vollmer, et al., "Bacterial Stress Responses to 1-Megahertz Pulsed Ultrasound in the Presence of Microbubbles," Applied and Environmental Microbiology, p. 3927-3931, Oct. 1998.

* cited by examiner

DEVICES AND METHOD FOR TREATING COOLING FLUIDS UTILIZED IN TIRE MANUFACTURING

CROSS-REFERENCE TO RELATED APPLICATIONS

This application is a continuation of PCT Application No. PCT/US2005/041395, filed Nov. 15, 2005, now published as WO 2006/080969, which claims priority to U.S. Provisional Application No. 60/629,152, filed Nov. 17, 2004, both of which are hereby incorporated by reference.

BACKGROUND OF THE INVENTION

1. Field of the Invention

Embodiments of the present invention are directed to the decontamination of industrial fluids and, in particular, to the decontamination of cooling fluids utilized in tire manufacturing processes.

2. Description of the Related Art

The manufacturing of tires involves multiple steps, which typically include: mixing the rubber components, calendaring, extrusion, assembly, vulcanizing, inspection, and repair if needed. Certain steps in the tire manufacturing process involve the use of fluids to cool heated rubber compositions. For example, direct contact cooling systems are typically used to control the rate of tire tread and tire line cooling. These cooling systems are an important part of the tire manufacturing process.

The liquid vehicle for these cooling fluids is often water, including demineralized or deionized Water (DI). Unfortunately, cooling fluids utilized in tire-manufacturing process, especially water-based fluids, are susceptible to bacteria, algae, fungi, yeasts, molds and other microbial propagation. Biological contamination is usually associated with the formation of biofilm. As discussed in more detail below, biological contamination of these fluids can be costly and dangerous, thus, some biological control for these fluids is desired.

To confront this problem, the tire manufacturing industry has typically relied on the use of biocides such as iso-thiazoline and glutaraldehyde to control the levels of bacteria and algae in direct contact cooling water systems. However, using biocides can create additional problems.

For example, handling biocides can be dangerous for the workers. In addition, it is difficult to manually or automatically dose the biocide to the cooling system because the water to be treated is a relatively small volume. Furthermore, biocide is typically administered intermittently, from about once per week to up to several times per week. Thus, the dosage is not always applied on a consistent and predictable basis.

Additionally, the overuse of biocide chemicals is undesirable as it may affect the water chemistry, including the pH. The change in water chemistry could in turn affect the quality of the manufactured tires and/or manufacturing equipment. For example, when oxidizing biocide agents such as chlorine or bromine are used, overfeed of these compounds is corrosive to the manufacturing system metallurgy.

While chemical methods may be able to control the circulating water bacteria to some extent, ultimately, the microorganisms overcome the biocides and the microbial degradation of the fluid and contaminants results in foul odors in the work environment. Furthermore, even with microbial control, the use of biocides still results in significant accumulations and masses of biological deposits that typically develop throughout the system. Accordingly, the system usually has to be manually cleaned at least once per year and usually at least twice per year. This typically involves vacuuming out the accumulated sludge from the sumps and properly disposing it.

In addition to microbial propagation, the cooling fluids used in tire manufacturing also tend to accumulate silt, sediment, and other material (e.g., rubber) that regularly collect in the sump. While biocides can be used to treat microbial propagation, they are not effective at reducing additional materials, such as rubber, that accumulate in cooling fluids.

To obtain long usage of tire-manufacturing cooling fluid, it is desirable to develop a treatment of the fluid that does not modify its desired composition or characteristics. This is especially true when the changes in the cooling fluid negatively affect the quality of the manufacturing equipment or finished tire. Accordingly, there is a need in the art for an effective and new method of treating cooling fluids utilized in tire-manufacturing processes without the use of large amounts of biocides, and which can provide uniform protection, or substantially uniform protection with time.

SUMMARY OF CERTAIN INVENTIVE ASPECTS

To resolve these problems, preferred embodiments include methods for treating a tire manufacturing cooling fluid comprising simultaneously exposing said cooling fluid to gas and ultrasound of a frequency of 100 kHz or higher. In more specific aspects, the gas consists essentially of ambient air.

Further aspects herein are directed to apparatuses for reducing the presence of live microorganisms in a tire manufacturing cooling fluid, including a compartment for holding a reservoir of tire manufacturing cooling fluid, an ultrasound emitter configured to emit ultrasound signals at a frequency higher than 100 kHz into said compartment, and a gas emitter configured to emit gas into the ultrasound field in the compartment containing the cooling fluid. In some advantageous embodiments, the gas is not ozone. In even more specific aspects, the gas is selected from the group consisting of air and oxygen.

The treatment apparatuses may be configured such that they do not generate a stationary field phenomenon when ultrasound is emitted into the compartment, and can additionally comprise an electromagnetic radiation emitter configured to emit electromagnetic radiation in the visible range into the ultrasound field.

In addition, methods of treating tire manufacturing cooling fluid can include collecting tire manufacturing cooling fluid from a fluid routing circuit, routing said cooling fluid into a compartment, and simultaneously exposing said cooling fluid in the compartment to gas and ultrasound of a frequency of 100 kHz or higher.

Further embodiments include apparatuses including a tire manufacturing system, a cooling fluid circuit connected to the tire manufacturing system, a compartment for holding a reservoir of cooling fluid through which said cooling fluid is routed, an ultrasound emitter configured to emit ultrasound signals at a frequency higher than 100 kHz into said compartment, and a gas emitter configured to emit gas into the ultrasound field in the compartment containing the cooling fluid.

The methods and devices described herein can include a cyclone separator (sometimes referred to as a centrifugal separator). In a preferred embodiment, the cyclone separator uses centrifugal force to separate solids, such as rubber or other sediment, from the cooling fluid.

DETAILED DESCRIPTION OF CERTAIN EMBODIMENT

Figure 1:
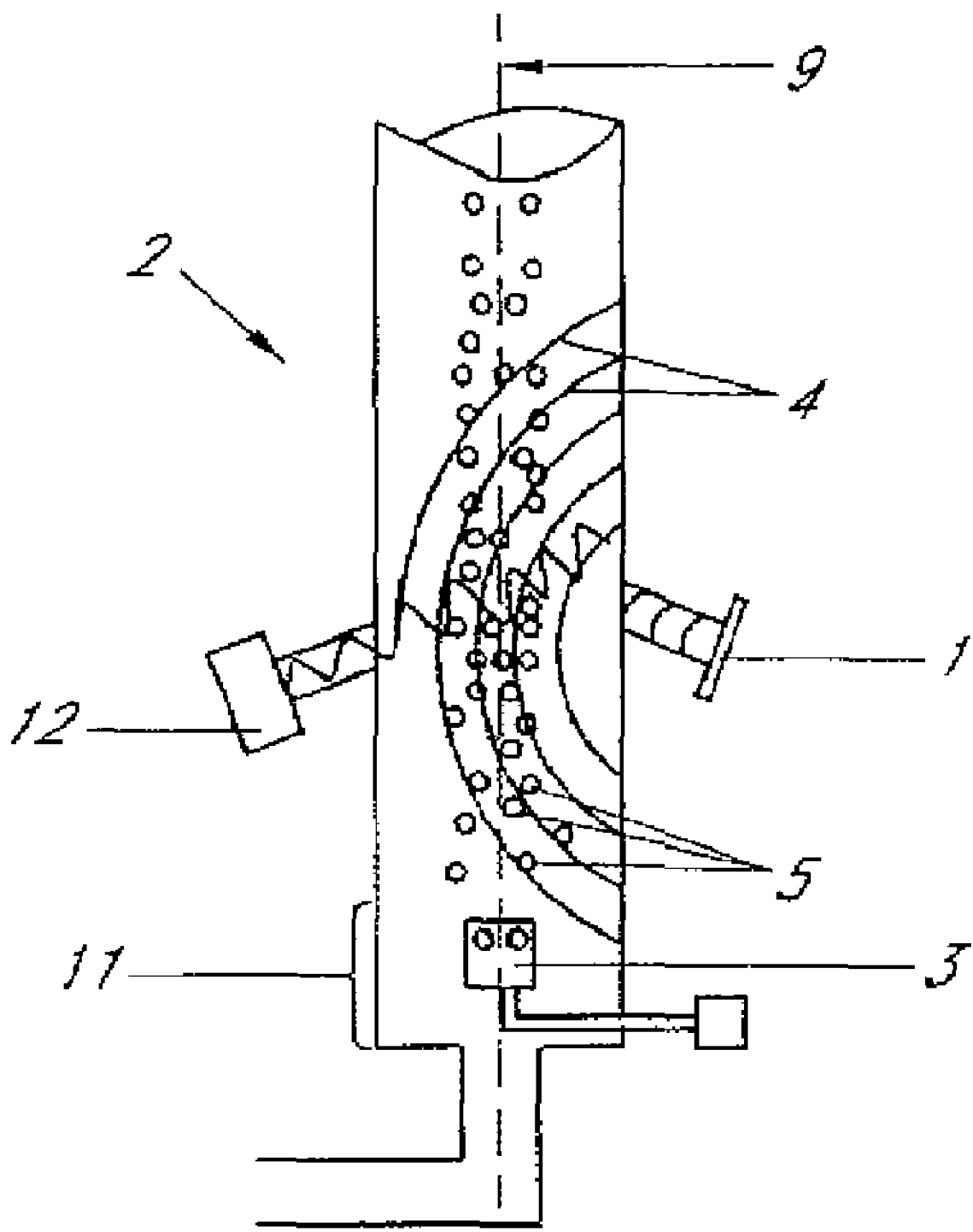
FIG. 1 is a drawing showing one embodiment of an ultrasound/microbubble device described herein.

Embodiments of the present invention include methods and devices for treating tire manufacturing cooling fluids. In one embodiment, a method includes simultaneously exposing said cooling fluid to gas microbubbles and high-frequency ultrasound. In another embodiment, a device includes a compartment for holding a reservoir of tire manufacturing cooling fluid, an ultrasound emitter configured to emit high-frequency ultrasound signals into the compartment, and a gas microbubble emitter configured to emit gas microbubbles into the ultrasound field in the compartment containing the cooling fluid.

The methods and devices described herein provide surprisingly effective and broad control of microorganisms in a number of tire manufacturing systems. This results in improved water cleanliness as measured by turbidity and other analytical techniques. While the terms "decontaminate" or "treat" are both used herein, these terms include use the disclosed methods and devices to inhibit contamination in tire manufacturing cooling fluids.

In addition, the methods and devices provided herein have been found to be highly effective at removing biofilm present in industrial tire manufacturing circuits, extending the useful life of cooling fluids utilized in these processes, and reducing or eliminating the risks posed to workers by heavily contaminated or biocide-treated cooling fluids utilized in tire manufacturing processes. More specifically, the embodiments herein prevent biofilm from significantly forming on the surface of solids or, if already present before the initiation of the high frequency/low power ultrasonic irradiation of the present technique, the biofilm is significantly reduced. In further embodiments, the teachings herein can also decontaminate particles which do not pass through the ultrasound compartment. For example, in industrial circuits, remote portions of the circuitry can be freed of biofilm, through the effect of the delayed biochemical mechanism of the disclosed methods.

By eliminating the use of microbiocidal treatment chemicals, the present invention provides tire manufacturers with chemical cost savings and eliminates potential safety and environmental concerns associated with the handling and storage of chemical microbiocides. In additional advantageous aspects, the costs for the disposal and replacement of contaminated cooling fluids utilized in tire manufacturing processes are substantially reduced.

The methods and devices herein can treat water-based fluids containing silt, sediment, and other material that typically requires regular and frequent cleaning out from sumps, such as rubber, for example. In certain embodiments the methods and devices described herein can reduce the sludge accumulated in conventional tire manufacturing systems by approximately 80-100%.

The devices and methods provided herein are also useful in reducing the number of quality rejects produced from tread line and other rubber components, compared to other conventional systems. The teachings herein can also significantly reduce the costs of replacement filter bags that are in place to filter the tread line water. The savings are in both the labor to the replace the bags and in cost of the disposable bag.

The methods and devices described herein also offer an environmentally friendly solution to cope with the most stringent environmental and health regulations. Specific embodiments are described in further detail below.

Embodiments of ultrasound devices which can be used in the tire manufacturing environment can be found in U.S. Pat. No. 6,736,979 and U.S. Pat. No. 6,540,922 to Cordemans et al. One particular embodiment of a device that can be used for treating tire manufacturing cooling fluid is illustrated in FIG. 1. The tire manufacturing cooling fluid to be treated can contain microorganisms and can also contain other solid matter such as rubber, for example.

The methods and devices herein can be used with rubber manufacturing or manipulating processes using cooling fluid, including tire manufacturing processes. For example, the methods and devices described herein can be used in conjunction with the tire manufacturing processes disclosed in U.S. Pat. No. 4,285,654 to Bohm et al. While the apparatuses and methods provided herein are not limited to a particular type of tire manufacture process, the six basic processes typically used in the manufacture of steel belted radial tires are described in more detail below.

The first step involves the mixing of carbon blacks, elastomers and chemicals to form the rubber compounds. The second step involves calendering fabrics and steel cord and coating them with rubber. For the third step, the treads and sidewall components are extruded. During the fourth step, the "green tire" components are manufactured on tire building machines. The fifth step involves curing or vulcanizing the tires with heat and pressure. Afterwards, final finishing steps are taken, including inspection, storage and shipping.

Figure 2:
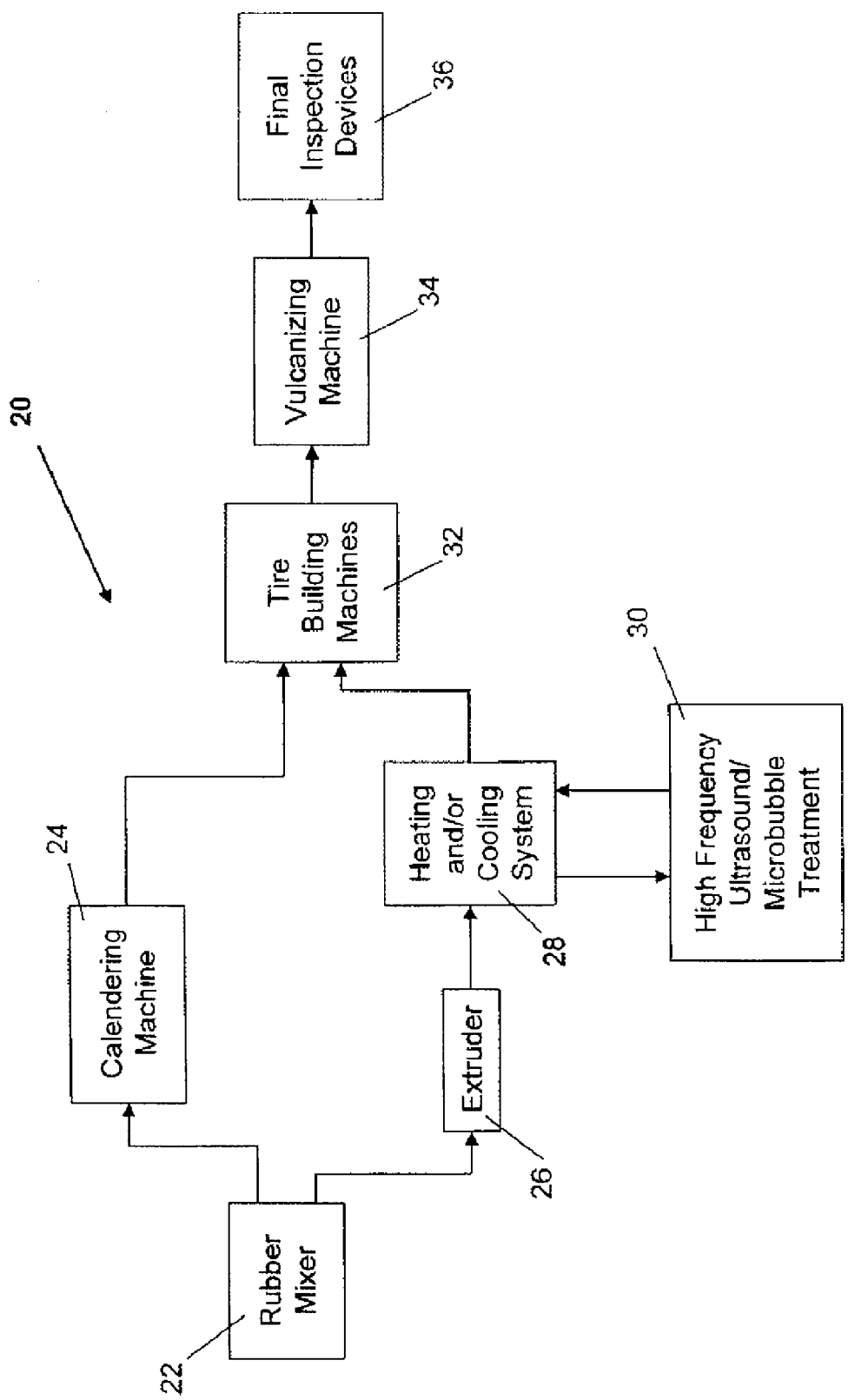
FIG. 2 is a drawing showing a tire manufacturing system configured to utilize an ultrasound treatment device for treatment of cooling fluid.

These general tire manufacturing steps can be carried out using the system disclosed in FIG. 2. As will be discussed in more detail below, a preferred tire manufacturing system 20 can include a rubber mixer 22, a calendering machine 24, an extruder 26, a heater and/or cooler 28, a high-frequency ultrasound device 30, one or more tire building machines 32, a vulcanizing machine 34, and final inspection devices 36.

Mixing

Tires can incorporate many different ingredients with the rubber compounds. These compounds can non-exclusively include: antioxidants, antiozonants, curing agents, elastomers, sulfur reinforcing agents, cobalt, magnesium oxide, rubber polymers, calcium carbonate, zinc oxide, carbon black, and processing materials. The compounds can be prepared by mechanically mixing in a mixer 22, to mechanically break down the rubber in an attempt to obtain a uniformly homogenous mass, or a relatively uniform homogeneous mass. The resulting mass can then be formed into slabs of rubber that are ready to be extruded or calendered for use in tire building. In preferred embodiments, treated cooling fluids according to the teachings herein will not detrimentally alter these rubber compositions.

Calendering

In general, the calendering process involves coating fabric cords and steel cords with rubber stock. The body plies and reinforcing strips can incorporate polyester cord that is coated in an adhesive liquid. The cord is typically passed between large heated rolls of a calendering machine 24. A woven fabric can be similarly prepared and calendered for the anti-chafing strips. Since rubber will typically not adhere to bare steel, the steel cord wires for the steel belts can be coated with a thin layer of brass. These brass coated, rubber encased steel cords (multi-strand cables) become the steel belts.

These wires are typically placed on a roller apparatus in a creel room, where temperature and humidity are controlled and monitored. The wire then typically passes from the creel room through the open plant to the calender. A strong bond between the rubber and the belt wire is advantageous in the construction of steel belted radial tires. The steel wire typically passes from the creel room on rollers through aligning combs into the calender where the wires are coated with a thin sheet of skim stock rubber. Preferably, the rubber should also penetrate the steel cords for maximum adhesion. Both the polyester cords and steel cords are typically cut at specified angles and widths for use in tire building.

Extrusion

Some tire components are formed by extrusion of uncured rubber. In general, tire components such as tread and sidewall are prepared by forcing uncured rubber compound through an extruder to shape the tire tread or sidewall profiles. The extruder 26 in a tire manufacturing process is usually a screw-type system, consisting primarily of an extruder barrel and extruder head. Typically, the rubber compound is fed into the extruder barrel where it goes through a heating, blending, and pressurizing process. Then, the rubber compound flows to the extruder head where it is shaped under pressure. Extrusion is one of the most important operations in the tire manufacturing process because it processes most of the rubber compounds produced from the mixing operation and then prepares various components for the ultimate tire building operation.

Tire tread, or the portion of the tire that comes in contact with the road, consists of tread itself, tread shoulder, and tread base. Since there can be three different rubber compounds used in forming this complex tread profile, the extruder system often includes three different extruders sharing an extruder head. Often times, three rubber compounds are extruded simultaneously from different extruders and are then merged into a shared extruder head. Typically the next step is to transfer the rubber compounds to a die plate where the shape and dimensions are formed, and then through a long heating and/or cooling line 28 to further control and stabilize the dimensions. A cooling line usually involves cooling fluid, such as water and is often from 100 to 200 feet long. At the end of the line, the tread is cut according to a specific length and weight for the tire being built.

Both the process of heating and cooling rubber components can be accomplished by any suitable means known in the art for this purpose, such as steam, hot air, spray, or a water bath, respectively. The methods herein can be used to treat fluid within any of these types of heaters and/or coolers.

FIG. 1 depicts one example of a high-frequency ultrasound device 30 that can be used to treat cooling fluids in a tire manufacturing system. Referring to this figure, the devices described herein can include a compartment 2, preferably in the shape of a cylinder or a rectangular cross-section. In further embodiments the compartment 2 can be in communication with a reservoir (not shown) which holds the cooling fluid to be treated. The term "reservoir" is to be construed broadly, and generally relates to an apparatus containing cooling fluid. In specific embodiments the devices provided herein are connected (e.g., via a side stream) through the sump to the recirculating cooling fluid. In further embodiments, the devices provided herein are not in communication with a reservoir and are directly connected to the cooling fluid to be treated.

In further embodiments, the compartment 2 contains (e.g., along its wall) one or more high-frequency ultrasound emitters 1 that emit ultrasound 4 into the compartment 2 (preferably into the center of this compartment 2). In other embodiments the container can also have one or more microbubble emitters 3 for emitting gas microbubbles 5, which are arranged so as to emit the gas microbubbles 5 into the ultrasound 4 field emitted in the compartment 2.

The term "microbubbles," as used herein, is intended to refer to gas bubbles with an average diameter of less than 1 mm. In some embodiments the diameter is less than or equal to 50 µm. In still other embodiments the microbubbles have a diameter less than about 30 µm. In certain embodiments the microbubbles are selected from air, oxygen, and ozone microbubbles. To lower operating costs, it can be advantageous to use microbubbles that are not ozone microbubbles, such as air microbubbles.

The term "microorganisms" is synonymous with microbes and generally relates to pathogenic or non-pathogenic microorganisms which can give rise to harmful effects to tire manufacturing equipment (e.g., machinery, tools, etc.), man, mammals or any other animal. Such microorganisms can include both aerobic and anaerobic bacteria, viruses, protists (e.g., mold, algae), and the like, for example.

In specific embodiments, the methods and devices herein include low energy, high-frequency, ultrasound to treat a cooling fluid. The term "high frequency" is intended to refer to frequencies higher than 100 kHz and up to several MHz. In certain embodiments, the high frequencies used are between 200 kHz and 10 MHz. In various embodiments, the ultrasound frequency can be selected from between 200 kHz to 3 MHz. In another embodiment, the frequency used is between 200 kHz and 1.8 MHz.

In various embodiments of the methods and devices described herein, the microbubble emitter 3 for emitting gas microbubbles 5 is arranged at the base 11 of the compartment 2, (i.e., at the bottom of the compartment 2), such that the microbubbles move by rising naturally or by entrainment of the gas in the flow of the cooling fluid.

In still further embodiments, the devices and methods provided herein, neutralize, treat or prevent the growth of microorganisms in a cooling fluid. Although the present teachings are in no way to be limited by their precise mechanism of action, in more specific embodiments the devices provided herein can produce radicals such as $ROO^-$, $H^-$, $^-OH$ and $HOO^-$. These radicals can also form $H_2O_2$, which along with the radicals, is toxic to microorganisms and can bring about their inactivation and/or destruction.

Advantageously, the energy required to produce these toxic species is reduced if the process is performed in the presence of microbubbles, as described herein.

It has been recently appreciated that the injection of microbubbles into the ultrasound field gives rise to an increase in the phenomenon of sonoluminescence, by superposition of the microbubbles onto the cavitation bubbles induced by the ultrasound, the number of excited and toxic species can be multiplied. This phenomenon is observed on a macroscopic level when the ultrasound treatment is synergistically combined with the presence of microbubbles of suitable size.

The effect of direct irradiation (e.g., ultrasound, laser, light) on certain molecules (e.g., classical photosensitizers and sonosensitizers) is the generation of highly active oxygen species such as singlet oxygen, superoxide radicals, or fatty acid radicals, which can play an important role, in particular in biochemical processes resulting from oxidative stress, in bactericidal properties of the treated cooling medium. Specifically, a singlet oxygen can oxidize the various cell components, such as the proteins, lipids, amino acids and nucleotides, for example.

The production of extremely active oxygenated species such as the superoxide radical or singlet oxygen, can result in a series of biochemical reactions that are extremely toxic for bacterial, fungal, algal, and mold cells.

In certain embodiments, the water used in tire-manufacturing processes is deionized or demineralized.

Various embodiments are directed towards devices and methods which do not require additional chemical products such as biocides, photosensitizers, and/or sonosensitizers to neutralize, prevent the growth of, and/or remove cells from a cooling fluid medium. While the devices and methods provided herein can be used in conjunction with other drugs such as photosensitizers, sonosensitizers, it is important to note that the effectiveness of the provided methods and devices in treating living cells is not dependent on the use of other chemicals, reagents, or drugs. Accordingly, the methods and devices described herein can be used without additional chemicals, or reagents, including biocides or other anti-microbial agents. In other embodiments, however, the methods and devices herein can be used in conjunction with additional chemical agents.

In additional embodiments, the devices and methods provided herein have the advantage that there is no need to devote the ultrasound to specific zones, since it is observed that the treatment system functions by diffusing the products formed in situ (for example: molecular messengers, ROS: (reactive oxygen species), radicals and $H_2O_2$ formed towards the reservoir 6 of the cooling fluid to be treated.

In further embodiments, the one or more ultrasound 4 emitters 1 in the devices described herein are oriented so to limit standing-wave phenomena. For example, in certain embodiments, one or more ultrasound emitters can be oriented obliquely relative to the axis 9 of the compartment 2 (acute angle not perpendicular to this axis 9) and relative to the flow of cooling fluid and to the flow of microbubbles 5. This characteristic makes it possible for all the microbubbles 5 in the compartment 2 to be treated in a statistically identical manner, without creating stationary zones in the said compartment 2. Accordingly, certain embodiments herein are directed to devices and methods that provide uniform treatment, or substantially uniform treatment, and protection over time.

According to other embodiments, the devices and methods described herein can include a light emitter 12 (i.e. an electromagnetic radiation emitter) which emits into the compartment 2 in the ultrasound 4 field, radiation, with a frequency that is mostly in the visible range. However, for certain applications, in order to remove certain specific microorganisms, it can be advantageous to emit electromagnetic radiation with a frequency that is mostly non-visible, as ultraviolet radiation (e.g., UVA, UVB or UVC type), infrared, laser, microwaves, and the like, for example.

A treatment comprising the emission of microbubbles into the fields combined with ultrasound and light radiation is particularly effective at inactivating and removing microorganisms present in a cooling fluid, and preventing their growth. The phenomenon of sonoluminescence can promote the production of extremely active oxygenated species (often referenced as ROS: reactive oxygen species) such as the superoxide radical, $^-OH$ or singlet oxygen, which can result in a series of biochemical reactions that are extremely toxic for certain microorganisms.

In other embodiments, the devices and methods described herein can include a pump or other devices for recirculating the cooling fluid, as well as devices for recovering the microorganisms present in the cooling fluid. Examples of devices for recovering the microorganisms non-exclusively include apparatuses for filtration, centrifugation, and precipitation (such as cyclones, and the like). In certain embodiments, the pump and/or devices for recovery are arranged between the reservoir containing the cooling fluid, to be treated and the compartment 2.

In further embodiments, the cooling fluid can be collected through gravity flow, velocity flow, or trenches (e.g., conveyorized trenches). In specific embodiments, after the cooling fluid is collected, it can be treated according to the methods provided herein and recirculated throughout the cooling system.

The methods and devices herein can be used to treat practically any type of cooling fluid used with any suitable equipment (e.g., machine) capable of rubber manufacturing or manufacture, such as tire manufacturing, for example, and can be used to treat any suitable type of cooling fluid currently used in tire manufacturing or that will be available in the future. Practically any cooling fluid, including any of the following general categories of fluids utilized in tire manufacturing processes, can be used with the devices and methods described herein: aqueous media, emulsions, dispersions or solutions. The term "cooling fluid" is to be construed broadly and generally relates to fluids used in any step in the cooling process. In every method and apparatus embodiment disclosed herein the term "cooling fluid" can be substituted for the term "heating fluid" which encompasses fluids used to heat rubber components in tire manufacturing processes.

Based on the above-mentioned functions, properly treated cooling fluids utilized in tire manufacturing processes can lead to longer equipment life, and improved quality of the finished tires.

In further embodiments, the devices and methods herein can be used in conjunction with one or more other methods that prevent microbial propagation including: centrifuging, filtering, aerating, cleaning the sump, removing solids, and adding biocides, for example. Accordingly, in certain embodiments, the devices and methods herein relate to applying high-frequency ultrasound either before, after, or during one or more the above-mentioned treatment methods, or other anti-microbial treatments.

Tire Building

Most steel belted radial tires are assembled by hand with the aid of a tire building machine 32. The first stage builder typically constructs the tire on a cylindrical rotating drum. Usually, during the first stage of tire building process, the inner liner, body plies, beads, bead reinforcing strips and sidewalls are assembled by the first stage tire builder. During second stage tire building, the steel belts and tread are applied. The tire components, known as "green tire" components, are held together mechanically by their tack or stickiness. Prior to assembly the body plies and steel tread components are stored in large rolls. Prior to the components being transferred to the building machines they are often stored in this rolled configuration. Woven fabric liners are placed between the layers of the rolled material to prevent the components from sticking together.

Vulcanization (Cooking/Curing)

During the vulcanization process, the "green tire" is placed in a mold and placed over an inflatable rubber bladder. Typically, the vulcanizing machine 34 is a two piece metal mold. The bladder works by forcing the tire against the mold, forming the sidewall patterns and tread pattern. The molding is typically accomplished through the use of steam pressure or hot water inside of the bladder.

The rubber components of the tire are usually vulcanized by steam generated heat in the mold and bladder at high temperature and pressure. This heat results in chemical and physical changes in the rubber compounds. At the molecular level, important chemical changes can occur during vulcanization. In general, the "green tire" rubber components are transformed from plastic consistency to the consistency found in a finished tire. The vulcanization process chemically and physically links the various components, forming what should be a nearly inseparable bond. The shorter rubber molecules are linked to the long polymer chain linked molecules.

When the molecules in the various components properly bond, the interfacing surfaces are obliterated forming the finished green tire. As a result of vulcanization, the rubber becomes essentially insoluble and cannot be processed by any of the means used to manipulate the "green rubber" during the assembly process.

Final Inspection and Repair

After vulcanization, tires are typically visually inspected and placed on a tire uniformity machine (TUG) before they are sent to the warehouse. When an abnormality is discovered, the tire is typically sent to classifiers who can route the tire to repair, scrap the tire, or set the tire aside for further inspection. These repairs may include buffing and grinding. The tire can be spot vulcanized or repaired by the repairman so that the repair cannot be seen. After final inspection/repair, tires are sent to the warehouse where tread labels are placed on them and then they are then transferred to the retailer.

Various instruments and machines can be used to inspect manufactured tires. Non-exclusive examples include visual inspection devices, balance inspection devices, force and moment inspection devices, and X-Ray machines. In preferred embodiments the apparatuses herein include these inspection instruments and machines. In additional embodiments, the methods of treating cooling fluid disclosed herein can be used with apparatuses that include inspection machines and/or instruments. Final inspection devices 36 are illustrated in the tire manufacturing system depicted in FIG. 2.

While the foregoing description details certain embodiments of the teachings herein, it will be appreciated, however, that no matter how detailed the foregoing appears in text, the devices and methods herein can be practiced in many ways.

As is also stated above, it should be noted that the use of particular terminology when describing certain features or aspects of the teachings herein should not be taken to imply that the terminology is being re-defined herein to be restricted to including any specific characteristics of the features or aspects of the teachings herein with which that terminology is associated. The scope of the teachings herein should therefore be construed in accordance with the appended claims and any equivalents thereof.

What is claimed is:

1. An apparatus comprising:
   a tire manufacturing system;
   a cooling fluid circuit in fluid connected to the tire manufacturing system;
   a compartment for holding a reservoir of cooling fluid through which said cooling fluid is routed;
   an ultrasound emitter configured to emit ultrasound signals at a frequency higher than 100 kHz into said compartment; and
   a gas emitter configured to emit gas into the ultrasound field in the compartment containing the cooling fluid.

2. The apparatus of claim 1, further comprising a cyclone separator configured to centrifuge out solid particles from the cooling fluid.

3. The apparatus of claim 1, wherein the apparatus is configured such that the ultrasound emitted into the compartment does not generate a stationary field phenomenon.

4. The apparatus of claim 1, further comprising an electromagnetic radiation emitter configured to emit electromagnetic radiation in the visible range into the ultrasound field.

5. The apparatus of claim 1, wherein the gas emitter comprises a gas microbubble emitter.

6. A tire making apparatus comprising:
   a rubber mixer;
   an extruder;
   a cooling bath;
   an ultrasound and gas treatment apparatus in fluid connection with said cooling bath; and
   a tire building machine.

\* \* \* \* \*